United States Patent
Schönfeld

(10) Patent No.: US 6,276,491 B1
(45) Date of Patent: Aug. 21, 2001

(54) REGULATOR FOR ADJUSTING THE FLUID FLOW IN A HYDROSTATIC OR AEROSTATIC DEVICE

(76) Inventor: Robert Schönfeld, Gemeindeländerweg 23, D-73095 Albershausen (DE)

(*) Notice: Subject to any disclaimer, the term of this patent is extended or adjusted under 35 U.S.C. 154(b) by 0 days.

(21) Appl. No.: 09/486,622
(22) PCT Filed: Aug. 11, 1998
(86) PCT No.: PCT/EP98/05080
  § 371 Date: Feb. 29, 2000
  § 102(e) Date: Feb. 29, 2000
(87) PCT Pub. No.: WO99/11943
  PCT Pub. Date: Mar. 11, 1999

(30) Foreign Application Priority Data

Aug. 29, 1997 (DE) .............................................. 197 37 781

(51) Int. Cl.⁷ .................................................... F16C 32/06
(52) U.S. Cl. ......................... 184/7.3; 137/501; 137/503
(58) Field of Search ............................ 184/7.3; 137/501, 137/503; 251/50, 53, 54, 57

(56) References Cited

U.S. PATENT DOCUMENTS

| | | |
|---|---|---|
| 1,972,907 * | 9/1934 | Shaw . |
| 2,938,756 * | 5/1960 | Loeb ..................................... 137/501 |
| 3,047,005 * | 6/1962 | Karr ...................................... 137/501 |
| 3,432,213 | 3/1969 | Adams . |
| 3,570,522 * | 3/1971 | Horsch et al. ..................... 137/501 X |
| 3,621,938 * | 11/1971 | Beattie ................................. 184/7.3 |
| 3,656,822 | 4/1972 | Schwartzman . |
| 3,779,274 | 12/1973 | Kelly . |
| 4,113,325 * | 9/1978 | Miller ...................................... 384/12 |
| 4,694,852 * | 9/1987 | Grant ..................................... 137/501 |
| 4,776,367 * | 10/1988 | Hilmersson et al. .................. 137/501 |
| 4,922,956 * | 5/1990 | Taube, Sr. et al. .................... 137/504 |
| 5,123,506 * | 6/1992 | Sirven ................................... 188/280 |
| 6,076,548 * | 6/2000 | Schonfeld ............................. 137/501 |

FOREIGN PATENT DOCUMENTS

| | | |
|---|---|---|
| 2102110 | 7/1972 | (DE) . |
| 2456032 | 6/1975 | (DE) . |
| 2829787 | 1/1979 | (DE) . |
| 3150117 | 7/1983 | (DE) . |
| 3533037 | 12/1986 | (DE) . |
| 19518089 | 10/1995 | (DE) . |
| 0840190 | 5/1998 | (EP) . |
| 931540 | 2/1948 | (FR) . |
| 997880 | 1/1952 | (FR) . |
| 2130997 | 11/1972 | (FR) . |

* cited by examiner

Primary Examiner—Stephen M. Hepperle
(74) Attorney, Agent, or Firm—Ostrolenk, Faber, Gerb & Soffen

(57) ABSTRACT

A controller for controlling a medium flow fed from a supply to at least one hydrostatic or aerostatic pocket of a bearing, a threaded spindle nut or a guide, having a housing and having pressure chambers which are separated by a control element, movable against the force of a spring element, and of which a first pressure chamber, subjected to a first pressure level, is directly connected to the medium supply, a second pressure chamber, subjected to a lower, second pressure level, is connected to the medium supply via a first flow resistance, and a third pressure chamber, which is subjected to a third pressure level which corresponds to that in the pocket, is connected to the pocket, a control element forming a variable second flow resistance is arranged between the second and third pressure chambers influencing the medium flow to the pocket and whose magnitude is raised by the action of the force of the first pressure chamber but is lowered by the action of the spring force and by the actions of the forces of the second and third pressure chambers. The housing has a bearing surface, comprising a passage orifice for the medium flow, with the aid of which the controller bears against a mating surface assigned to the bearing, the threaded spindle nut or the guide, thus creating a direct medium connection between controller and pocket and/or medium supply.

15 Claims, 3 Drawing Sheets

REGULATOR FOR ADJUSTING THE FLUID FLOW IN A HYDROSTATIC OR AEROSTATIC DEVICE

Description

The invention relates to a controller for controlling a medium flow fed to at least one hydrostatic or aerostatic pocket of a bearing, a threaded spindle nut or a guide, in accordance with the preamble of claim 1.

Controllers of the type addressed here are known for liquids (DE 35 33 037 C1). They are distinguished by the fact that the fluid flow influenced by the controller increases in the event of a pressure rise in the hydrostatic pocket. Hydrostatic bearings, threaded spindle nuts or guides which cooperate with controllers of the above-named type are distinguished on the basis of this in that the achievable stiffnesses and loadings of these elements are substantially higher in the case of comparable technical data than those with alternative systems. The flow rate Q is proportional to the third power of the gap height or the height h of the pocket gap through which the medium flows. The result in the case of laminar flow is the condition $Q \sim p \cdot h^3 / \eta$, $\eta$ denoting the dynamic viscosity of the medium or the liquid. This relationship is valid in a similar way for gaseous media.

It follows from the assignment reproduced here that the change in the height h owing to a pressure change in the hydrostatic pocket through an increase in the liquid flow or the flow rate Q can be reduced, or virtually completely avoided. Thus, if a hydrostatic pocket is loaded such that the pressure prevailing in this hydrostatic pocket is increased, it is possible to counteract a change in gap height, and thus a displacement of the parts which are guided or supported, by virtue of the fact that the fluid flow flowing from the controller into the hydrostatic pocket is enlarged. The result of this is a higher stiffness.

The known controller is conceived such that normally at least two controllers are combined in one block and are fed by a common pressure connection. This concept leads in many cases to the fact that it is necessary to create relatively long connecting lines between the controllers and the hydrostatic pockets with an outlay which is partly considerable, the spatial accommodation of these lines frequently being very difficult, for example, when supplying screw drives which have a hydrostatic nut. It is, furthermore, disadvantageous in the known controller that the latter frequently tends to vibrate because of the high kinetic energy of the fluid/gas in the lines.

It is therefore the object of the invention to create a controller which can be used for liquid and also for gaseous media and which does not have the said disadvantages.

In order to achieve this object, a controller is proposed which has the features named in claim 1. The controller is distinguished in that the mating surface is assigned to the bearing, the threaded spindle nut or the guide, and wherein the controller housing has a bearing surface, comprising a passage orifice for the medium flow, with the aid of which in the mounted state the controller housing bears against the mating surface assigned to the bearing, the threaded spindle nut or the guide, thus creating a direct medium connection between the controller and pocket and, if appropriate, between the controller and the medium supply. In connection with the present invention, a "direct" medium connection is understood to be a connection which is made without screwing and additional mounting elements. Thus, the medium connection is formed at the same time as the controller is fitted on the mating surface. As a result, it is possible to simplify the design of the controller, on the one hand, and to reduce the outlay on mounting it, on the other hand. The mating surface can, for example, be a partial surface of a housing of the bearing, the threaded spindle nut or the guide. It is thereby possible to arrange the controller in the immediate vicinity of the hydrostatic/aerostatic pocket, so that it is possible to implement short connecting lines between the controller and the pocket. It is thereby possible to prevent vibrations of the medium in the connecting lines, but at least largely to reduce or weaken them. The controller can be mounted simply and quickly and is also distinguished by a simple design.

In an advantageous embodiment of the controller, it is provided that the controller housing comprises at least two housing parts between which the first pressure chamber, the control element, the second pressure chamber and the second flow resistance are arranged. It is thereby possible to implement a particularly compact design of the controller.

Also preferred is an embodiment of the controller in which the first flow resistance is recessed into the bearing surface, formed on the first housing part, and/or into the mating surface. "Recessing" is understood to mean both the introduction of the first flow resistance by means of a cutting tool, for example a miller, and noncutting machining. The first flow resistance can thus also be pressed or forced into the surface provided therefor, or can be molded during production of the first housing part and/or the mating surface.

Further advantageous refinements follow from the remaining subclaims.

The invention is explained in more detail below with the aid of the drawing, in which.

Figure 1:
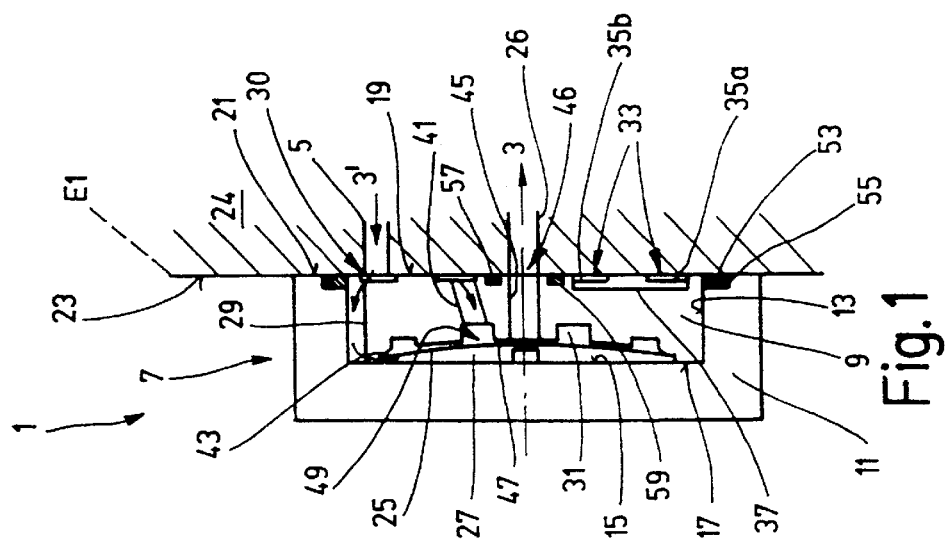

FIG. 1 shows a cross section through a first exemplary embodiment of a controller 1 which serves the purpose of controlling a medium flow which is fed to a consumer, in particular a hydrostatic or an aerostatic pocket (not represented here) via a medium connection 3. Such pockets are to be found in the case of hydrostatic or aerostatic bearings, threaded spindle nuts and guides. The controller 1 is supplied via a feedline 5 with a liquid medium, for example, preferably oil, by a pump, which is driven by a motor (not represented) and serves as medium supply. Purely by way of example, it is assumed below that the medium is a liquid.

The controller 1 has a controller housing 7 which comprises two separable housing parts 9 and 11. The first housing part 9, which is designed as a circular disk, is arranged in a blind bore 13 of the second housing part 11, which is of pot-shape design. The blind bore 13 has a contour adapted to the outer contour of the first housing part 9, and is consequently of circular design here. With its surface 17 which faces the base 15 of the blind bore 13, the first housing part 9 bears against said base, the thickness of the first housing part 9 being selected in such a way that the side of the first housing part 19 which is situated opposite the surface 17, specifically the bearing surface 19, is situated essentially in the same imaginary plane E1—running perpendicular to the plane of the image of FIG. 1, like the housing surface 21 of the second housing part 11.

The controller 1 is represented in the mounted state in FIG. 1. In this case, the bearing surface 19 of the first housing part 9, and the housing surface 21 of the second housing part 11 bear against a mating surface 23 of a housing 24 of a bearing, threaded spindle nut or guide. Opening in the mating surface 23 are both a connecting line 26, which is part of the medium connection 3, and the feedline 5, connected to the medium supply, which is part of a medium connection 3'.

The design of the controller 1 is explained in more detail below: said controller comprises three pressure chambers which are separated by a control element 25 formed by a resilient plate. Via a cutout 29 in the first housing part 9, which is open at the edge and extends up to a passage orifice 30 which is arranged at the point of the first housing part 9 which is situated in the mounted state of the controller 1 opposite the feedline 5 opening in the mating surface 23, the first pressure chamber 27 is connected to said feedline 5. The first pressure chamber 27 is subjected to a first pressure level p1 which corresponds essentially to that of the medium supply. The second pressure chamber 31 is connected via a first flow resistance 33, which cannot be varied, to the supply lead 5, and thus to the medium supply, that is to say the pump (not represented). When the medium flows through the first flow resistance 33, a second pressure level p2 is present in the second pressure chamber 31. More detail will be given on the third pressure chamber further below.

In the case of this exemplary embodiment, the first flow resistance 33 is recessed into the bearing surface 19 of the first housing part 9 and is formed by two circular annular grooves 35a and 35b which are interconnected via a groove 37 designed in the form of an elongated hole. Like the annular grooves 35a, 35b—the groove 37 is recessed into the first housing part 9 starting from the bearing surface 19 of the latter. The feedline 5 connected to the medium supply opens into the outer annular groove 35a in a region which is offset by an angular region of approximately 180° relative to the groove 37. This region which is formed by a circumferential region of the annular groove 35a and in which the medium flows from the supply line 5 into the controller is denoted below as passage orifice 30. As may be seen from FIG. 2, which shows a bottom view of the controller 1 in accordance with the FIG. 1, the medium supplied by the medium supply flows in two subflows indicated by arrows 39, one of them clockwise and the other counterclockwise over an angular region of the annular groove 35a of approximately 180° to the groove 37. From the latter, the medium passes into the inner annular groove 35b and is divided up in turn into two subflows which flow clockwise and counterclockwise over an angular range of the circular annular groove 35b of approximately 180° up to a channel—formed in this exemplary embodiment as a circular bore 41—and from said channel into the second pressure chamber 31.

The control element 25 represented in FIG. 1 is recessed in a depression 43 starting from the surface 17 of the first housing part 9, and formed here in a circular fashion, in such a way that the depression 43 is subdivided into the first pressure chamber 27 and the second pressure chamber 31. For this purpose, the control element 25 is arranged in the depression 43 in an at least largely pressuretight fashion.

In the exemplary embodiment represented in FIG. 1, there is provided in the middle of the depression 43 a circular projection which has a central bore 45, which is part of the medium connection 3, and an annular surface 47 surrounding the bore 45. The control element 25 or the resilient plate forms a variable second flow resistance 49 with the annular surface 47. In the unpressurized state of the controller 1, the control element 25 does not touch the annular surface 47 since—as may be seen in FIG. 1—the annular surface 47 lies in a different plane than the bearing surface for the control element 25. The control element 25 serving as second flow resistance 49 thus separates the second pressure chamber 31 from a third pressure chamber, which has a pressure level p3 and is formed by the medium connection 3 leading to the pocket (not represented here).

In operation of the pump, the medium is conveyed into the second pressure chamber 31 via the feedline 5 and via the first flow resistance 33. From there, the medium passes into the central bore 45 via the variable second flow resistance 49, specifically via a passage gap, influenced by the control element 25, between the bearing surface of the control element 25 and the annular surface 47. From said bore, the medium passes via a passage opening 46 into the connecting line 26 arranged in the housing 24, and passes further to the pocket. During operation of the controller 1, the first flow resistance 33 causes a pressure drop, with the result that the second pressure level provided in the second pressure chamber 31 is lower than the first pressure level p1 in the first pressure chamber 27. Furthermore, during operation the variable second flow resistance 49 effects a pressure drop, with the result that the pressure level p3 provided in the medium connection 3 (bore 45, connecting line 26), which corresponds to the pressure in the hydrostatic pocket, is lower than the pressure level p2.

FIG. 1 shows that the control element 25 is thus subjected, on the one hand, to the pressure p1 in the first pressure chamber 27 and, on the other hand, to the pressure p2 provided in the second pressure chamber 31 and to the pressure p3 provided in the third pressure chamber or in the medium connection 3. In addition, the spring force of the control element 25 formed by a resilient plate acts in such a way that said force is codirectional with the pressure force based on the pressure level p2 and p3.

In stationary operation of the controller 1, that is to say in the case of constant pump pressure p1 and constant pressure p3, the sum of the forces from the three named pressures and the spring force on the control element 25 is equal to zero. If, in the case of constant pressure p1 and p3, the pressure p2 is reduced, for example by a disturbance, the control element 25 is moved to the right in FIG. 1 by the then preponderant pressure p1, and the magnitude of the variable second flow resistance 49 is enlarged such that the sum of the forces on the control element 25 is once again equal to zero, with the result that the pressure p2 thus reaches its original value again. The inverse process would proceed given an enlargement of p2 because of a disturbance. Thus, given a constant pressure pl and p3, the controller 1 sets a constant differential pressure (p1–p2) across the first flow resistance 33 and thus through the controller 1. If the pressure p3 in the third pressure chamber provided by the medium connection 3, and thus in the hydrostatic pocket changes sufficiently slowly so that dynamic forces can be neglected, it may also be said for this that the sum of the forces from the three pressure values and the spring force is equal to zero. As a result a higher pressure p3 is assigned a lower pressure p2, that is to say a higher differential pressure (p1–p2) and thus a larger flow rate Q.

Figure 3:
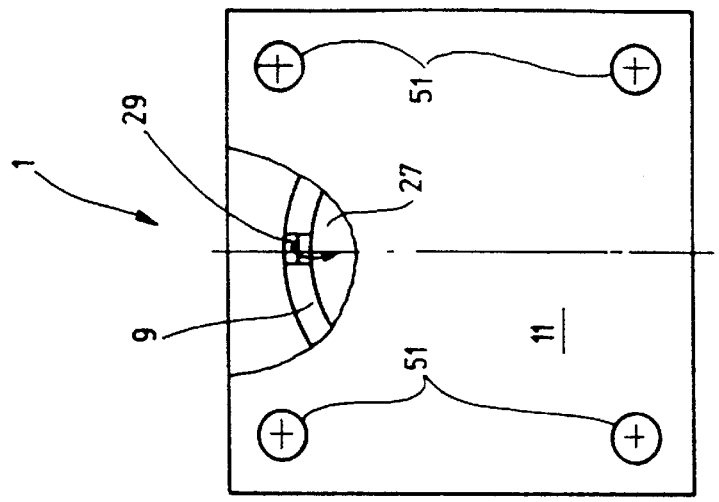
FIGS. 1 to 3 show a plan view, a cross section and a bottom view of an exemplary embodiment of the controller according to the invention.

FIG. 3 shows a plan view of the controller 1, whose second housing part 11 has a plurality, here a total of four bores 51 which extend both through the cover of the second housing part 11 and through the lateral surface thereof. In order to mount the controller 1, fastening means (not represented), for example screws are passed through the bores 51 and screwed in threaded bores provided therefor, which are recessed in the housing 24 of the bearing, threaded spindle nut or guide. In this case, the housing surface 21 of the second housing part 11, and the bearing surface 19 of the first housing part 9, which is arranged in the blind bore 13 of the second housing part 11, are brought to bear against the mating surface 23 of the bearing, threaded spindle nut or guide. As a result, a direct medium connection is created without additional mounting elements between the controller 1 and pocket and between the controller 1 and medium supply.

The blind bore 13 of the second housing part 11 is sealed against the environment by means of a seal 53, which is represented in FIG. 1 and arranged in an annular groove 55. The annular groove 55 is recessed into the second housing part 11 starting from the housing surface 21 of the latter. Furthermore, in the region where the bearing surface 19 bears against the mating surface 21 the passage orifice 46 of the bore 45 is sealed against the annular groove 35b of the first flow resistance 33 by means of a seal 57 which—starting from the bearing surface 19 of the first housing part 9—is arranged in an annular groove 59 surrounding the bore 45.

The first flow resistance 33 can be recessed into the bearing surface 19 and/or into the mating surface 23. However, it is also possible to integrate the first flow resistance 33 into the housing surface 21 of the second housing part 11. A further possibility of the arrangement of the first flow resistance 33 is in the surface 17 of the first housing part 9, that is to say the side of the first housing part 9 averted from the bearing surface 19. It remains to be noted that the first flow resistance 33 can be integrated into the first housing part 9, the second housing part 11 and/or the housing 24 of the bearing, threaded spindle nut or guide.

Figure 2:
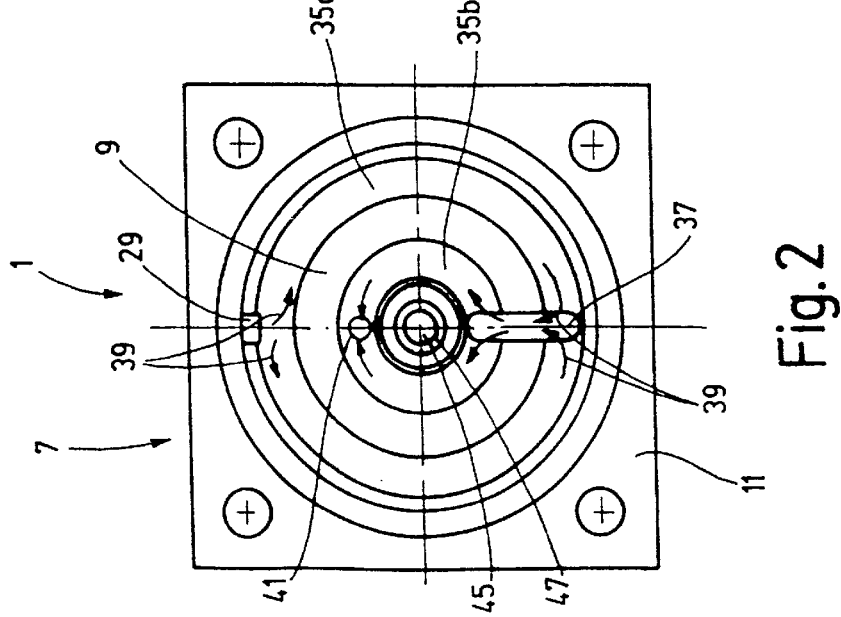
Figure 4:
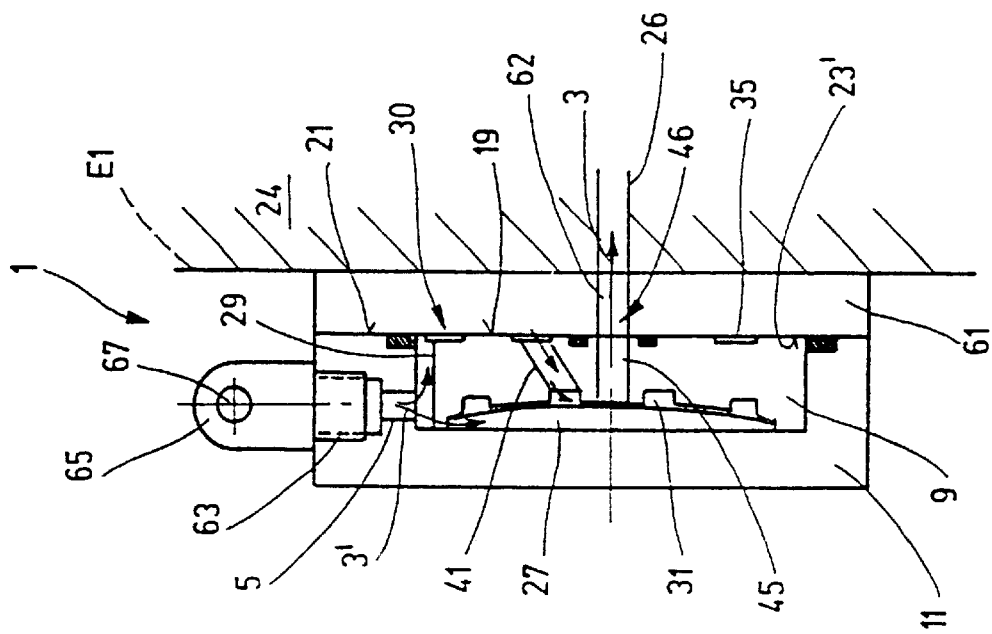
FIGS. 4 and 5 show a bottom view and a cross section of a further exemplary embodiment of the controller.

FIG. 4 shows a cross section through a second exemplary embodiment of the controller 1. Parts which correspond to those in FIGS. 1 to 3 are provided with the same reference symbols, and so reference is made for their description to FIGS. 1 to 3. In this exemplary embodiment, the mating surface 23', against which the first housing part 9 bears with its bearing surface 19, and the second housing part 11 bears with its housing surface 21, is formed by a surface of an intermediate plate 61 arranged between the controller 1 and the housing 24 of the bearing, threaded spindle nut or guide. Recessed in said plate is a connecting channel 62 which is formed by a bore and connects the bore 45 in the first housing part 9 of the controller 1 to the connecting line 26, which is arranged in the housing 24 of the bearing, threaded spindle nut or guide and extends up to the hydrostatic or aerostatic pocket.

In the controller 1 represented in FIG. 4, the medium connection 3' takes place between the medium supply, that is to say the pump (not represented) and the controller 1 via the second housing part 11. For this purpose, there is recessed into the second housing part 11 of the controller 1 a threaded bore 63 into which there opens the feedline 5 which is connected to the first pressure chamber 27 via the cutout 29, opened at the edge, in the first housing part 9. A connection 65, which is part of an annular line 67, is screwed into the threaded bore 63. The annular line 67, which can be connected to further controllers (not represented) is used to lead the medium from the medium supply into the controller 1. For this purpose, the connection 65 has a bore (not represented) which connects the annular line 67 to the feedline 5.

The first flow resistance 33, which is formed here by only an annular groove 35, is also recessed into the bearing surface 19 of the first housing part 9 in the case of the exemplary embodiment represented in FIG. 4. It is possible, alternatively, to integrate the first flow resistance of the controller into the mating surface 23', with the result that given a controller which exists and is already mounted, the first flow resistance can easily be changed to a desired value simply by inserting another intermediate plate, of which the annular groove or annular grooves forming the first flow resistance of the controller has/have (a) different resistance value(s). Of course, it is also possible for the first flow resistance to be recessed both into the bearing surface 19 and into the mating surface 23'. Then, as well, the first flow resistance can be changed in a defined way either by exchanging the intermediate plate for another, or by omitting the intermediate plate.

In a further exemplary embodiment, it is provided to recess the first flow resistance of the controller exclusively into the intermediate plate 61, for example into the surface of the intermediate plate 61 which bears against the housing 24 of the bearing, threaded spindle nut or guide. It is possible, furthermore, to integrate the first flow resistance partially or completely into the housing 24. It remains to be noted that the first flow resistance can be integrated into the first housing part 9, the intermediate plate 61 and/or the housing 24.

Figure 5:
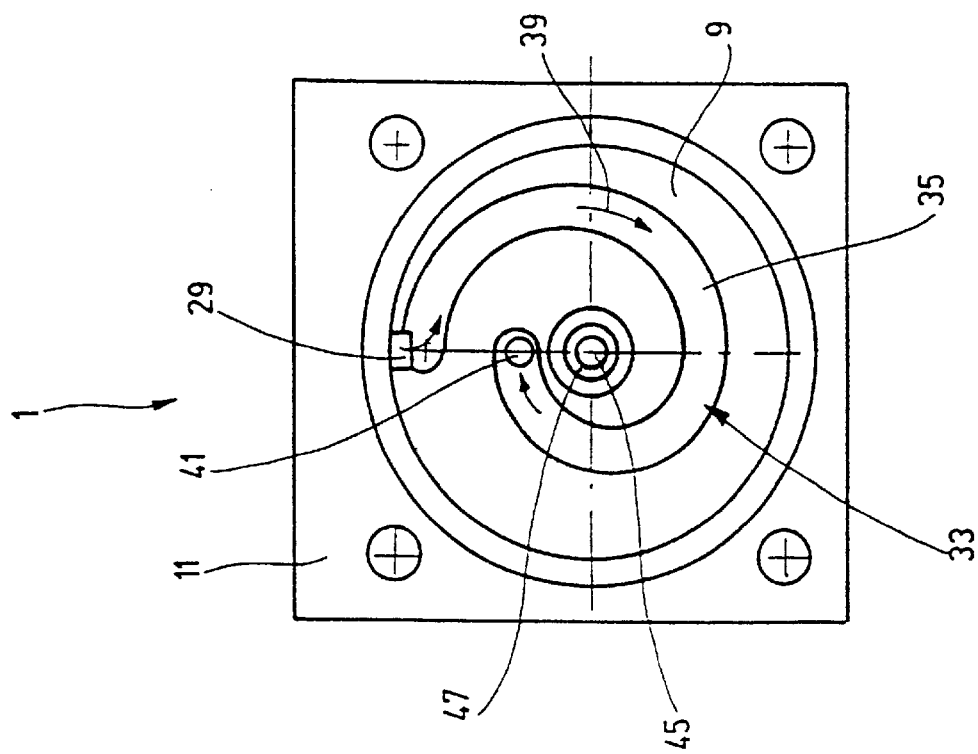

FIG. 5 shows a bottom view of the controller 1 represented in FIG. 4, in which the first flow resistance is formed by only an annular groove 35, a spiral one here. This is recessed into the first housing part 9 starting from the bearing surface 19 thereof.

Figure 6:
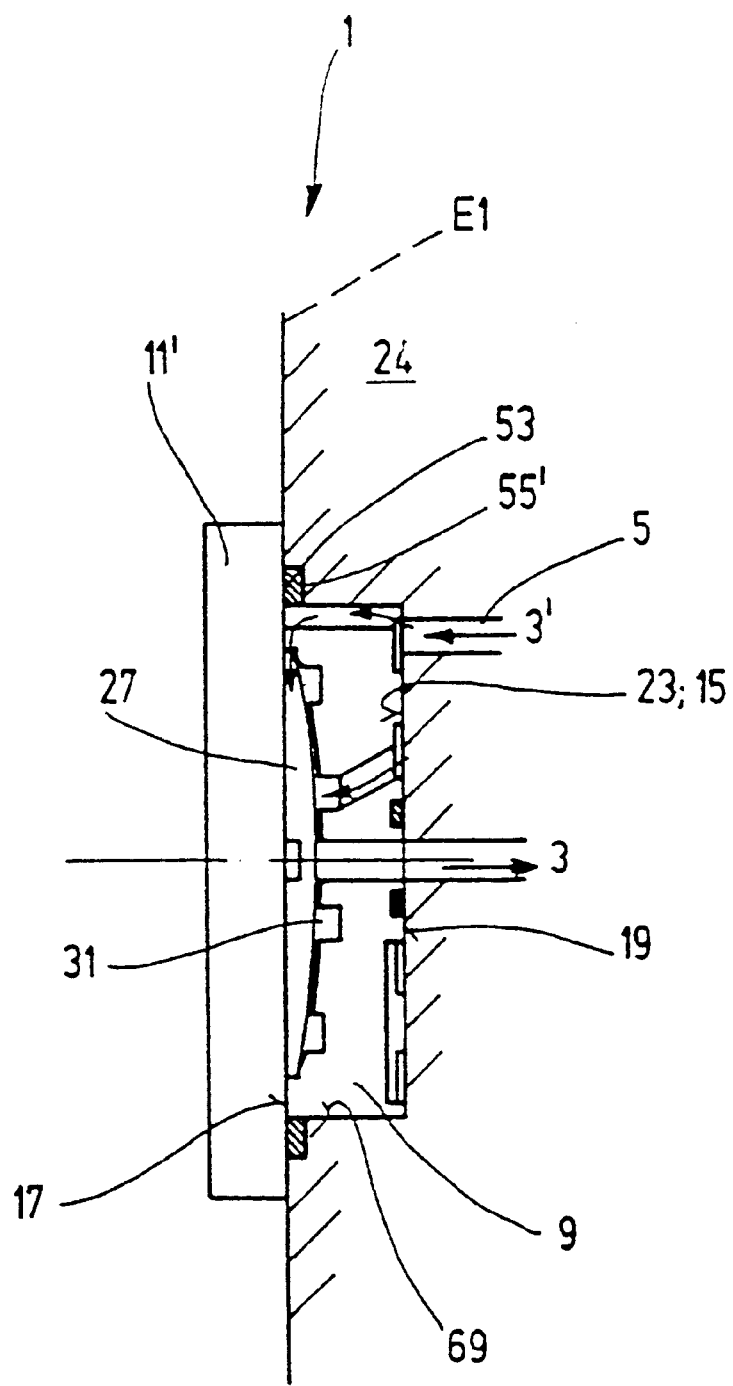
FIG. 6 shows a cross section of a third exemplary embodiment of the controller.

FIG. 6 shows a cross section through a third exemplary embodiment of the controller 1. The same parts are provided with the same reference symbols, and so reference may be made to the preceding figures as regards their description. Only the differences will be more closely examined below. The first housing part 9 of the controller 1 is arranged in a circular blind bore 69 which is recessed in a housing 24, indicated only by dashes, of the bearing, threaded spindle nut or guide. The first housing part 9 bears with its bearing surface 19 against the mating surface 23 of the housing 24, which is formed by the base of the blind bore 69. The second housing part 11' of the controller 1 represented in the mounted stage in FIG. 6 is—like the first housing part 9—of disk-shaped design and fitted on the housing 24 of the bearing, threaded spindle nut or guide in such a way that the blind bore 69 is sealed with the first housing part 9 arranged therein. This embodiment of the controller 1 with the controller housing 7 partially integrated into the housing 24 of the bearing, threaded spindle nut or guide is a particularly spacesaving one.

It is a common feature of all the exemplary embodiments described with the aid of FIGS. 1 to 6 that the controller housing 7 comprises at least two housing parts between which the first pressure chamber 27, the control element 25, the second pressure chamber 31 and the second flow resistance 49 are arranged.

In the exemplary embodiment in accordance with FIG. 6, the first flow resistance 33 is recessed into the bearing surface 19 formed on the first housing part 9 of the controller housing 7. However, it is also possible to recess the first flow resistance 33 into the mating surface 23 or 23', the mating surface 23' being a housing surface of the bearing, threaded spindle nut or guide, or the surface of an intermediate plate 61 arranged between the controller and the bearing, threaded spindle nut or guide. In a further exemplary embodiment, it is provided that the first flow resistance 33 is recessed both in the bearing surface 19 of the first housing part 9 of the controller housing 7, and into the mating surface 23, 23'. The first flow resistance 33 can also be recessed straightaway into the housing surface 21 of the second housing part 11 or 11'. Finally, it is also possible to integrate the first flow resistance 33 into the surface 17 of the first housing part 9.

The first flow resistance 33 can be formed by one or more grooves which have a linear and/or curvilinear shape, being spiral or circular, for example. The groove or the grooves which form the first flow resistance can be of virtually any desired shape.

In an exemplary embodiment of the controller, in which the first flow resistance is recessed into the bearing surface 19, formed on the first housing part 9, and/or into the mating surface 23, 23', the first flow resistance can be very easily cleaned in the demounted state of the controller. This is also possible, furthermore, in the case of an exemplary embodiment in which the first flow resistance is recessed into the housing surface 21 of the second housing part 11 or 11'.

An exchange of the controller 1 is possible very easily, for example by virtue of the fact that the controller housing comprises at least two housing parts, by exchanging at least one of the two housing parts with another one, as a result of which, for example, the first flow resistance, and thus the control response of the controller, can be varied.

It may be noted by way of summary that the controller can be mounted simply and quickly without the need for additional mounting elements by virtue of the direct medium connection between controller and pocket and/or medium supply, which is formed directly upon mounting the controller 1 onto a mating surface assigned to the bearing, threaded spindle nut or the guide. Furthermore, owing to the direct arrangement of the controller on the hydrostatic/aerostatic pocket of the bearing, threaded spindle nut or guide it is possible to implement short connecting lines between the controller and the pocket, with the result that the medium in the connecting lines does not vibrate or does so only relatively slightly.

What is claimed is:

1. A controller for controlling a medium flow fed from a medium supply to at least one hydrostatic or aerostatic pocket of a bearing, a threaded spindle nut or a guide, having a controller housing with a mating surface and having pressure chambers which are separated by a control element, movable against the force of a spring element, and of which a first pressure chamber, subjected to a first pressure level, is directly connected to the medium supply, a second pressure chamber, subjected to a lower, second pressure, is connected to the medium supply via a first flow resistance, and a third pressure chamber, which is subjected to a third pressure level which corresponds to that in the hydrostatic pocket, is connected to the hydrostatic or aerostatic pocket, said control element forming a variable second flow resistance which is arranged between the second and third pressure chambers and influences the medium flow fed to the pocket, the magnitude of the variable second flow resistance being raised by the action of the force of the first pressure chamber but is lowered by the action of the spring force and by the actions of the forces of the second and third pressure chambers, wherein the mating surface is assigned to the bearing, the threaded spindle nut or the guide, and wherein the controller housing has a bearing surface, comprising a passage orifice for the medium flow, with the aid of which in the mounted state the controller housing bears against the mating surface assigned to the bearing, the threaded spindle nut or the guide, thus creating a direct medium connection between the controller and pocket and, if appropriate, between the controller and the medium supply.

2. The controller as claimed in claim 1, wherein the controller housing comprises at least three housing parts including a first housing part, a second housing part and a third housing part between which the first pressure chamber, the control element, the second pressure chamber and the second flow resistance are arranged.

3. The controller as claimed in claim 2, wherein the first flow resistance is recessed into the bearing surface, formed on the first housing part, into the mating surface, or both on the first housing part and into the mating surface.

4. The controller as claimed in claim 1, wherein the mating surface is a housing surface of the bearing, threaded spindle nut or guide.

5. The controller as claimed in claim 2, wherein the first flow resistance is introduced into a housing surface of the second housing part.

6. The controller as claimed in claim 1, wherein the first flow resistance is introduced into the surface, averted from the bearing surface, of the first housing part, which has the bearing surface.

7. The controller as claimed in claim 1, wherein the first flow resistance is connected to the second pressure chamber via at least one channel introduced into the first housing part.

8. The controller as claimed in claim 1, wherein the medium connection can be implemented between the medium supply and controller via the second housing part.

9. The controller as claimed in claim 2, wherein the second housing part has a blind bore in which the first housing part is arranged.

10. The controller as claimed in claim 2, wherein the first housing part is arranged in a blind bore introduced into the housing of the bearing, threaded spindle nut or guide, and wherein the blind bore can be sealed by means of the second housing part.

11. The controller as claimed in claim 1, wherein the mating surface is the surface of an intermediate plate arranged between the controller and the bearing, spindle nut or guide.

12. The controller as claimed in claim 1, wherein said at least one channel is formed as a circular bore.

13. The controller as claimed in claim 9, wherein said second housing part is pot-shaped.

14. The controller as claimed in claim 9, wherein said blind bore is circular.

15. The controller as claimed in claim 10, wherein said first housing part is round and is arranged in a circular blind bore.

* * * * *